(No Model.) 2 Sheets—Sheet 1.

E. B. SINTZENICH.
BALANCED SLIDE VALVE.

No. 478,719. Patented July 12, 1892.

Witnesses:
H. L. Osgood
Jno. E. Marsellus

Inventor:
Edwin B. Sintzenich (No Model.) 2 Sheets—Sheet 2.

E. B. SINTZENICH.
BALANCED SLIDE VALVE.

No. 478,719. Patented July 12, 1892.

WITNESSES:
H. L. Osgood
Wm. E. Marsellus

INVENTOR:
Edwin B. Sintzenich

UNITED STATES PATENT OFFICE.

EDWIN B. SINTZENICH, OF ROCHESTER, NEW YORK.

BALANCED SLIDE-VALVE.

SPECIFICATION forming part of Letters Patent No. 478,719, dated July 12, 1892.

Application filed April 27, 1891. Serial No. 390,670. (No model.)

*To all whom it may concern:*

Be it known that I, EDWIN B. SINTZENICH, a resident of Rochester, county of Monroe, and State of New York, have invented certain new and useful Improvements in Balanced Slide-Valves for Steam-Engines, of which the following is a specification, reference being had to the accompanying drawings, in which—

Figure 1:
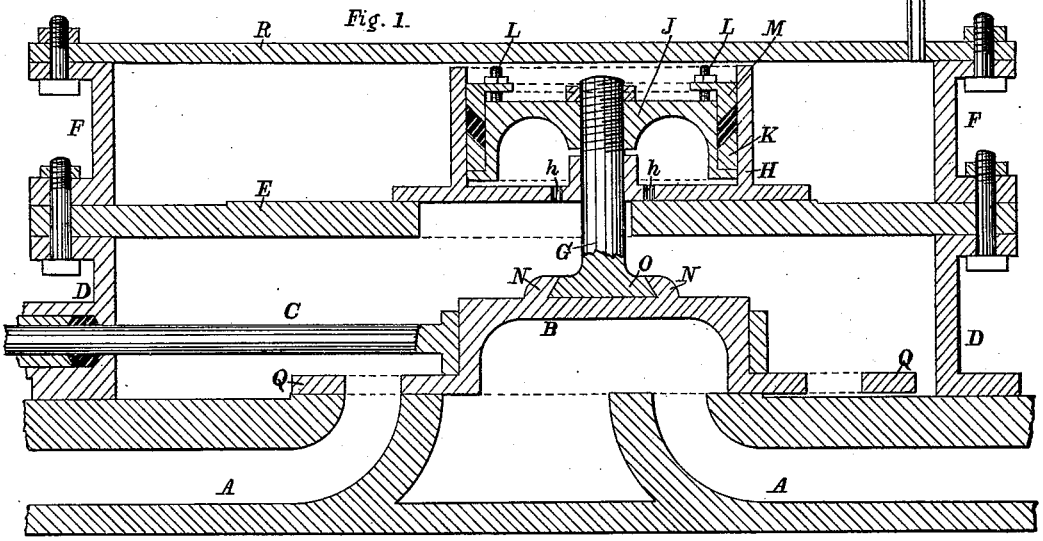
Figure 2:
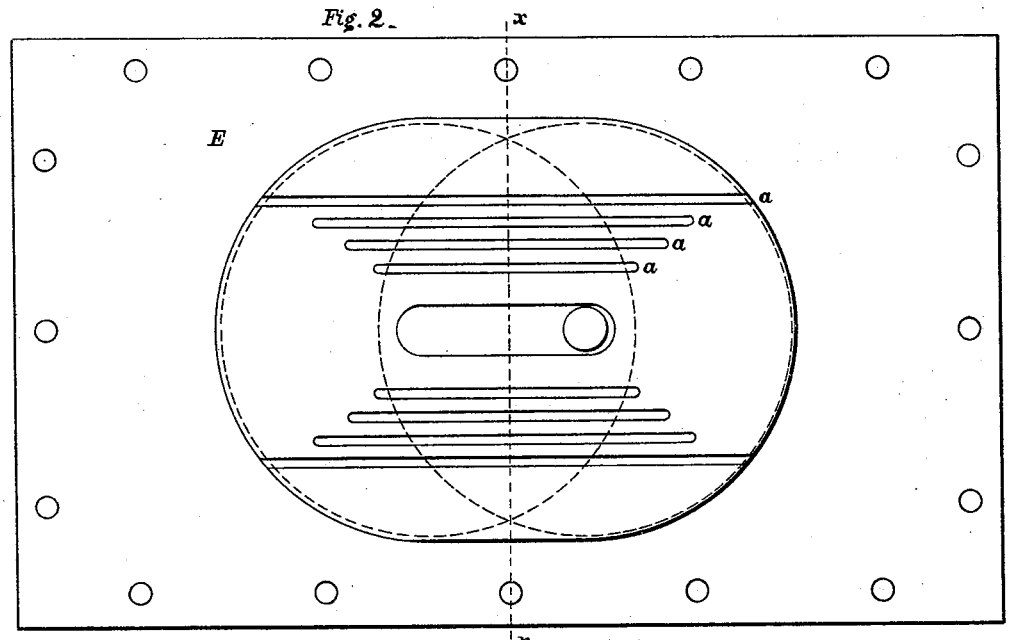
Figure 3:
Figure 4:
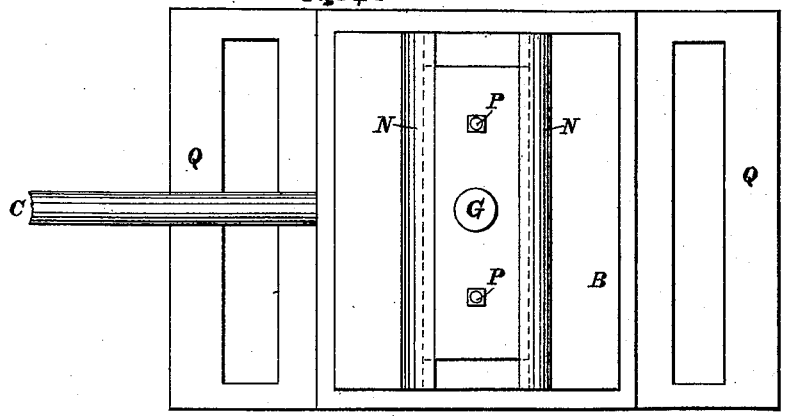
Figure 5:
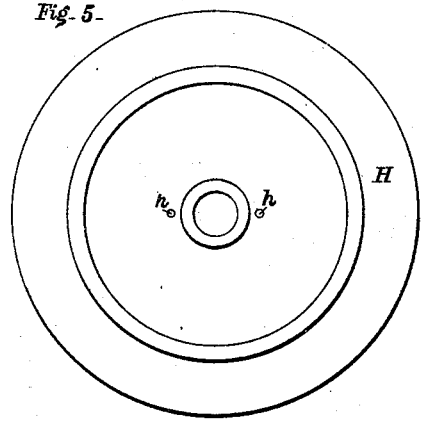
Figure 6:
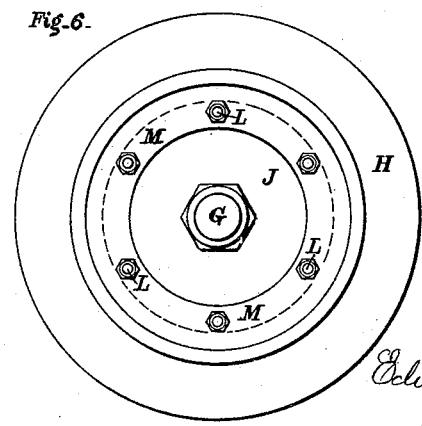

Figure 1 is a longitudinal section of part of the steam-engine cylinder, including the steam-chest and balance-chest. Fig. 2 is a plan view of the plate forming the cover of the steam-chest and the seat of the balancing device. Fig. 3 is a cross-section on the line $x$ $x$ of Fig. 2. Fig. 4 is a plan view of the slide-valve. Fig. 5 is a plan view of the cylinder of the balance device. Fig. 6 is a plan view of the balancing device with the floating piston.

Similar letters indicate similar parts in the several views.

My invention relates to the improvements hereinafter described and specified.

In the figures, A is that part of a steam-cylinder having induction and exhaust ports.

B is a slide-valve of any ordinary construction, to which is attached in any suitable manner the valve-rod C.

D is the steam-chest.

E is the steam-chest cover.

F is the chest or outer casing in which the balancing device is inclosed.

G is a pin or stud connected to the top of the slide-valve B and passing through a longitudinal slot in the plate E.

H is a cylinder having a head $i$, which may be cast integral with the remainder thereof, and a flange $j$, extending outside of the cylinder proper in the same plane with the head. Through a hole in the center of the head of this cylinder the stud G passes and so fits in this hole as to be capable of easy motion therethrough. To the end of the stud G is rigidly fastened a piston J, fitting the interior of the cylinder H and provided with means for properly packing it steam-tight within the cylinder, but yet capable of motion inside the cylinder, as hereinafter described. These parts constitute the balancing device whereby the pressure on the slide-valve is balanced.

The means of packing which I prefer are a ring K, of steel or other suitable metal, fitting on the outside of the piston J and split so as to be capable of expansion between the piston J and the interior of the cylinder H. I prefer to split this ring not diagonally, as usual with such devices, but in a plane passing through the axis of the ring. One side of this ring is beveled, as shown in the drawings.

By means of the bolts L L, I fasten to the piston J another ring M, which has an edge beveled in such a way as to be parallel, or substantially so, with the bevel of the ring K. Between the two rings I place a soft or suitable metallic packing S, and by means of the bolts L L, I am enabled to crowd the packing down upon the ring K, and thus to expand it by reason of its bevel, and by reason of the bevel of the ring M, I expand the packing S also against the side of the cylinder H. If any steam should leak between the piston J and the cylinder H, it would find its way into the space between the ends of the ring K and would tend to expand this ring the more.

I prefer to fasten the stud G to the slide-valve B by means as shown in the drawings. Upon the top of the slide-valve and at right angles to the direction of its motion I cast two gibs N N, having, as shown, inclined inner faces. The stud G is either fastened to or has cast integral with it a plate O, which is formed to fit into and between the gibs N N, and this plate is dovetailed to the slide-valve B and held by means of bolts P P. This construction permits a complete adjustment of the slide-valve and the balancing device and the stud G with reference to the slot in the plate F, and is also a stronger means of attachment than merely screwing the stud into the top of the slide-valve.

The slide-valve B is formed somewhat differently from the ordinary slide-valve, although the balancing device of my invention is applicable to ordinary valves and can be applied to the valve of ordinary engines by screwing the said stud G into or otherwise fastening it to the slide-valve.

In the device shown in the drawings the form of slide-valve which I prefer, in addition to the ordinary cavity to make connection between the exhaust-port and the port leading to the end of the cylinder from which the steam is exhausted, has at each end an extension or elongation Q, through which a port is cut to allow the steam to pass from the steam-chest through this port into the ports of the steam-cylinder. This elongation forms a wide bearing-surface on the valve-seat which, if combined with a seat slightly raised from the bottom of the valve-chest and small in comparison with the face of the slide-valve, will assist in reducing the uneven wear on valve-seat, caused by the difference in stroke which the engine may make at different pressures of steam, and especially in engines where the slide-valve is operated by link motions with their attendant variations in travel of the valve.

The balancing device, consisting of the piston J, cylinder H, and the connected parts above described, may be inclosed in a casing F, which may be provided with a cover R.

It will be noticed that balanced slide-valves have generally been made with the purpose not of lifting the slide-valve B to reduce the pressure on its seat, but with devices for the purpose of keeping the steam at the boiler-pressure from pressing down upon the top of the slide-valve, and this has been done usually by extending the slide-valve either directly or by connecting devices to the top of the steam-chest and keeping the extension steam-tight against the top of the chest. In my device, however, the purpose is not merely to keep the steam away from the top of the valve, but to lift the slide-valve by means of a piston which has an area sufficient, with the boiler-pressure, to counterbalance the downward pressure on the top of the slide-valve.

The steam-chest cover and seat of the balancing device E has a longitudinal slot, above mentioned, large enough and long enough to permit the stud G to move within it to the full travel of the slide-valve. Through the bottom of the head of the cylinder H are bored a suitable number of holes $h\,h$, through which the steam, after passing through the slot in the plate E, may enter the interior of the cylinder H. The steam within this cylinder presses on the under face of the piston J, which, being properly proportioned to the superficial area of the slide-valve B, will lift the slide-valve by the connecting-stud G to the proper extent. The steam, pressing down on the slide-valve, operates with an equal pressure to lift the piston J. I prefer to make the effective area of the piston J slightly less than that of the superficial area of the slide-valve B, in order that the slide-valve may certainly be kept upon its seat, and thus that leakage between the valve and its seat will be less apt to occur.

In experimenting with this balancing device I found that when the valve is at the end of its stroke the head of the cylinder H becomes exposed to a pressure of steam on one side, while the other side is protected from pressure, and therefore is apt to tilt and be lifted off from its seat on the side which is so exposed, (see Fig. 1,) and in order to obviate this difficulty I cut in the upper side of the steam-chest cover E, which forms the seat on which the head of the piston H slides, a series of longitudinal grooves $a\,a$. These grooves are made in pairs of different lengths, as shown in Fig. 2. When the cylinder (see dotted lines in Fig. 2) is at the end of its stroke, these grooves are covered through the greater part of their length; but one end of each of them will be uncovered and open into the casing F, where the pressure is that of the outside air. As the cylinder H moves toward the other end of its stroke these grooves $a\,a$ will, in pairs, be successively covered, and when it is at the other end of its stroke the other end of each of these grooves will again be uncovered. I have found that if the sum of the covered areas of these grooves exceeds the area of the slot through which the said stud G passes, the cylinder H is held down to its seat at all points in its course of motion and that the tendency to tilt, above described, is entirely obviated.

In order that the cylinder H shall be held to its seat, as described, the steam must be excluded from the grooves, so that there shall be no steam-pressure between the cylinder-head and the seat on which it slides. If the pressure of motive gas or vapor is excluded from these grooves, the sliding valve may be caused to cling to its seat by their use.

It is not necessary to the proper action of this balancing device that the cover R or that the casing F should be used, except for the purpose of keeping dust and dirt away from the working parts. An opening should always be made, however, through the cover R in order that the air-pressure within the casing F should be that of the outside air and in order that any steam which might leak thereinto should be set free, so as not to press upon the cylinder H or the piston J.

In steam-engines where condensers are used I may obtain an additional power for lifting the valve by closing said opening and by connecting the outer casing F to the condenser, as by the pipe T, and thus producing in the case a vacuum of greater or less degree and a consequent suction of the piston J upward, thus lifting the valve B. In fact, this device, with this appliance, is useful in many positions where there is a difference of pressures on two sides of the valve. A suction may be produced that will assist in sustaining the valve and reducing the pressure and friction on the valve-seat. This balancing slide-valve is useful not only in steam-engines, but in other motor-engines and pumps where a slide-valve is used.

What I claim is—

1. The combination of a slide-valve, a slotted steam-chest cover, a vertical cylinder sliding on said cover, a piston movable in said cylinder, and a stud passing through the slotted cover and connecting said piston to said slide-valve.

2. The combination of a slide-valve, a slotted steam-chest cover, a vertical cylinder sliding on said cover, a piston movable in said cylinder, a stud passing through the slotted cover and connecting said piston to said slide-valve, and the outer casing connected with a condenser or with other means of producing a diminished pressure.

3. The combination of a steam-chest, a slide-valve, a slotted steam-chest cover, a vertical-headed cylinder sliding on said cover, having perforations for admission of steam thereinto from the steam-chest and having a perforation through the head, a piston movable in said cylinder, and a stud passing through the slotted cover and through the perforation in the head and connecting said piston to said cylinder.

4. The combination of a steam-chest, a slide-valve, a slotted steam-chest cover, a vertical-headed cylinder sliding on said cover, having perforations for admission thereinto of steam from the steam-chest and having a perforation through the head, a piston movable in said cylinder, a stud passing through the slotted cover and through the perforation in the head and connecting said piston to said cylinder, and an outer casing connected with a condenser or with other means of producing a diminished pressure.

5. The combination of a slide-valve and a balancing device adapted to lift the slide-valve connected thereto by a stud removably dovetailed into the top of the slide-valve, arranged and operating as shown and described.

6. In a sliding balancing device for slide-valves, a series of longitudinal grooves in the face of the seat of said device from which the motive gas or vapor is excluded.

7. In a sliding balancing device for slide-valves, pairs of longitudinal grooves in the face of the seat of said device from which the motive gas or vapor is excluded.

8. In a sliding balancing device for slide-valves, pairs of longitudinal grooves in the face of the seat of said device from which the motive gas or vapor is excluded, each groove being longer than the balancing device.

9. In a sliding balancing device for slide-valves, a series of pairs of longitudinal grooves of increasing length in the face of the seat of said device from which the motive gas or vapor is excluded, each groove being longer than the balancing device.

10. In a balanced slide-valve having a balancing device sliding upon the top of the steam-chest cover, a series of longitudinal grooves in the face of the steam-chest cover, each groove being longer than the balancing device and of such length that when the grooves are uncovered at one end the balancing device covers them at the other end, and means for excluding the motive gas or vapor from said grooves.

11. The combination of a slide-valve, a slotted steam-chest cover, a vertical cylinder sliding on said cover, a piston movable in said cylinder, a stud passing through the slotted cover and connecting said piston to said slide-valve, and an extension on each end of said slide-valve, having a port therethrough, substantially as shown and described.

12. The combination of a slide-valve, a slotted steam-chest cover, a vertical cylinder sliding on said cover, a piston movable in said cylinder, a stud passing through the slotted cover and connecting said piston to said slide-valve, and an extension on each end of said slide-valve, having a port therethrough, together with a seat for said slide-valve smaller than the face thereof, substantially as shown and described.

EDWIN B. SINTZENICH.

Witnesses:
EDWARD B. FENNER,
H. L. OSGOOD.